(12) United States Patent
Devanagondi et al.

(10) Patent No.: US 6,611,524 B2
(45) Date of Patent: *Aug. 26, 2003

(54) PROGRAMMABLE DATA PACKET PARSER

(75) Inventors: Harish Devanagondi, Fremont, CA (US); James Sun, Mountain View, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,256

(22) Filed: Jun. 30, 1999

(65) Prior Publication Data

US 2003/0108038 A1 Jun. 12, 2003

(51) Int. Cl.[7] .............................................. H04L 12/56
(52) U.S. Cl. ................................... 370/395.5; 370/474
(58) Field of Search ............................ 370/395.5, 466, 370/474

(56) References Cited

U.S. PATENT DOCUMENTS

| | | | |
|---|---|---|---|
| 5,414,650 A | 5/1995 | Hekhuis ................. 364/715.02 |
| 5,465,322 A | 11/1995 | Hsu et al. .................... 395/114 |
| 5,509,006 A * | 4/1996 | Wilford et al. ............. 370/256 |
| 5,608,662 A * | 3/1997 | Large et al. ................. 370/394 |
| 5,805,808 A | 9/1998 | Hasani et al. ............. 395/200.2 |
| 5,812,074 A | 9/1998 | Chung ........................... 341/67 |
| 5,812,760 A | 9/1998 | Mendenhall et al. .. 395/185.02 |
| 5,881,242 A | 3/1999 | Ku et al. ................ 395/200.68 |
| 5,978,378 A * | 11/1999 | Van Seters et al. ......... 370/401 |
| 5,991,299 A * | 11/1999 | Radogna et al. ............ 370/389 |
| 6,157,641 A * | 12/2000 | Wilford ....................... 370/389 |
| 6,172,980 B1 * | 1/2001 | Flanders et al. ............ 370/351 |
| 6,212,183 B1 * | 4/2001 | Wilford ....................... 370/383 |
| 6,389,506 B1 * | 5/2002 | Ross et al. .................... 365/49 |

* cited by examiner

Primary Examiner—Hassan Kizou
Assistant Examiner—Dmitry Levitan
(74) Attorney, Agent, or Firm—Campbell Stephenson Ascolese LLP

(57) ABSTRACT

A data packet parser, for determining packet format, is substantially software controlled, to readily accommodate new or different formats, without the need for using a microprocessor for parsing. Comparisons are performed under the control of data stored in a database. By storing new or different data in the database, new or different packet formats can accommodated without the need for making hardware changes. In one embodiment, comparisons performed on various fields of the data packet result in setting or clearing bits of a signature word which identifies the packet format. The signature word can be used directly or indirectly such as forming the input argument of a ternary CAM, to provide a pointer to microcode which appropriately handles the data packet in the identified format.

44 Claims, 6 Drawing Sheets

PROGRAMMABLE DATA PACKET PARSER

The present invention relates to an apparatus and method for parsing data packets having different formats and in particular to parsing which is programmable, e.g. to accommodate new or different formats, but which can be provided without the need for using a microprocessor for parsing.

BACKGROUND INFORMATION

A number of electronic devices can receive data packets which may be in any of a plurality of different formats, which may not be known in advance. Examples include network routers, gateways, bridges, hubs and the like. Typically, information is included in the packets which is useful in determining how to handle or process the packets. For example, packets may include information regarding the destination of the packet, the size of the packet (or various fields therein) and the like. There are, however, a plurality of different formats for data packets and the location of information within various data packets may differ in the various formats. For example, one format may provide destination information in bytes 30 through 33 of a packet while another may provide destination information in bytes 38 through 41. Accordingly, in order to properly handle a data packet, it is typically necessary to determine the format of the data packet. The process of determining the format, and using such determination to identify the location of various data (e.g. to facilitate handling of the packet), is known as parsing the packet.

The parsing of network data packets presents certain challenges which are believed substantially unique compared to other types of parsing. For example, typically the time available for parsing a packet is driven by the rate at which packets arrive, i.e. a given packet typically must be fully parsed before the next packet arrives. In a typical situation it is substantially infeasible to predict the format of the next packet, i.e. packets may arrive in substantially random formats. In many situations, a given type of data, although positioned in different locations for different formats, nevertheless may be used in substantially the same way for different formats. For example, although destination information may be located at different places for differently formatted packets, the destination information is used in substantially the same way for handling many, if not all, of the differently-formatted packets.

Various devices and procedures have been used for packet parsing. In one approach, a microprocessor, or an embedded microcoded engine, executes microcode which performs a plurality of (typically sequential) tests or comparisons on various data and/or fields of the packet to determine the packet format. An advantageous aspect of this approach is that the system can be configured to accommodate new packet formats by revising the microcode, i.e. substantially without the need for redesigning hardware (such as without the need for redesigning the microprocessor). Unfortunately, this approach can be relatively expensive. If a microprocessor is used for parsing packets, the cost of the microprocessor can undesirably increase the cost of the network router or other apparatus. If the microprocessor is also being used for other purposes, there can still be substantial expense involved because it is necessary to provide a processor which has a sufficiently high performance that it can perform both parsing functions and other functions and can perform such functions quickly enough to accommodate the data rates or data speeds of the incoming packets. Thus, providing a microprocessor for packet parsing functions can involve providing a processor which has higher performance (and typically higher cost) than would otherwise be necessary. Accordingly, it would be useful to provide a packet parser which can be implemented in an economic fashion preferably without the need to use a microprocessor or an embedded microcoded engine for packet parsing functions.

Another approach for handling data packets has been using partly or fully hardwired logic. For example, hardwired logic may be configured to test a first predefined field or bit of each incoming packet and, depending on the result of the comparison, branching to a next comparison for a second field or bit of the packet. This procedure is repeated recursively until the packet is parsed. Each test, in this configuration, is performed by hardwired logic and, accordingly, one disadvantageous aspect of such an approach is that new or different formats cannot be accommodated with a change in programming or software. Rather, when the hardwired logic is implemented, e.g., in an application specific integrated circuit (ASIC), a new or different format for packets requires redesigning the hardwired logic and generating a new ASIC, typically at substantial expense. Typically, redesigning and refabricating an ASIC requires months of time and relatively high expense in nonrecurring engineering (NRE) charges. Moreover, because of the nature of the "tree" logic typically used for hardwired parsing, there is no guarantee that a new or different format can be accommodated by a minor change in the hardwired logic. Thus, accommodating a new or changed format may often involve substantial redesign of the logic tree, possibly at relatively high expense. Another generally disadvantageous aspect of hardwired parsers is that in-service parsers are not easily upgraded e.g. to accommodate new or different formats. Typically, the owner of a router or similar device with hardwired parsers must acquire, and have installed, new hardware in order to accommodate new or changed packet formats. There may be substantial network down time involved in such hardware installation. Accordingly it would be desirable to provide a packet parser which can accommodate new or different packet formats by way of upgrading in-service routers or similar devices, without requiring the installation of new hardware.

In general, it would be useful to provide a data packet parser which can accommodate new or changed data packet formats without the need for changing or redesigning hardwired logic or other hardware, preferably by merely making software or programming changes and preferably in a way such that a new or changed packet format can be accommodated without the need for redesigning an entire logic tree.

SUMMARY OF THE INVENTION

The present invention provides a method and apparatus for parsing data packets without the need for using a microprocessor to achieve such parsing, yet which can accommodate new or different packet formats without the need for changing hardwired logic or other circuitry or hardware (such as by changing programming or software). According to one embodiment, a database is stored, e.g. such as storing in a plurality of registers, which is used in providing a signature word for each packet, with the signature words being indicative of particular packet formats. New or different formats can be accommodated by changing the data stored in the database, e.g. to generate a new signature in response to a new or different packet format.

The signature can be used to directly control or determine processing for the data packet or handling. If desired, however, the signature can also be used to output other data such as using the signature as (all or part of) a key to a content-addressable memory (CAM) which outputs a pointer to an entry point in microcode. In this way, it is possible to avoid the need for reconfiguring hardwired logic or other hardware in order to accommodate new or different packet formats, but without needing to provide a microprocessor for packet parsing purposes.

In one embodiment, the database includes a plurality of registers, with each register being used for setting (or clearing) one or more bits of the signature word. For example, each register may define a word offset and/or bit field defining the bits of the packet to be compared, a data field defining the data to which the "masked" data from the packet is to be compared and an indication of which bit or bits in the signature word should be set (or cleared) as a result of the comparison. In this way, storing new or modified data in the registers suffices to provide a new and unique signature word in response to a new or different packet format.

DETAILED DESCRIPTION

Figure 1A:
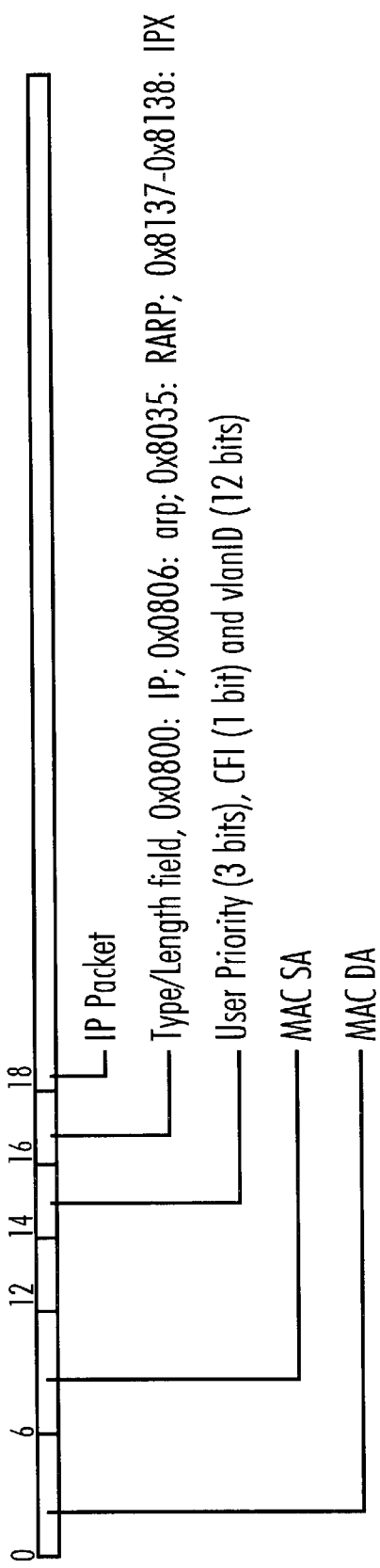
FIGS. 1A through 1C depict the various fields in data packets according to examples of three different packet formats.
Figure 1B:
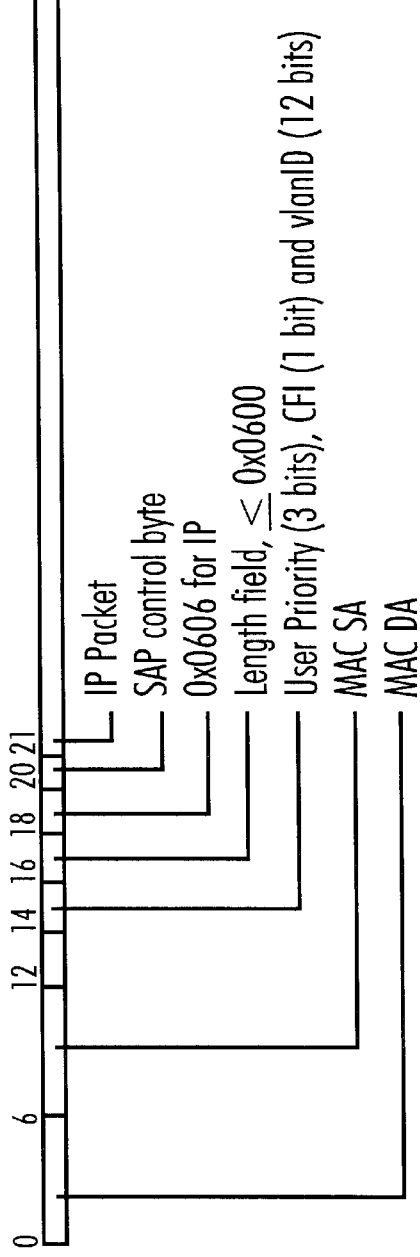
Figure 1C:
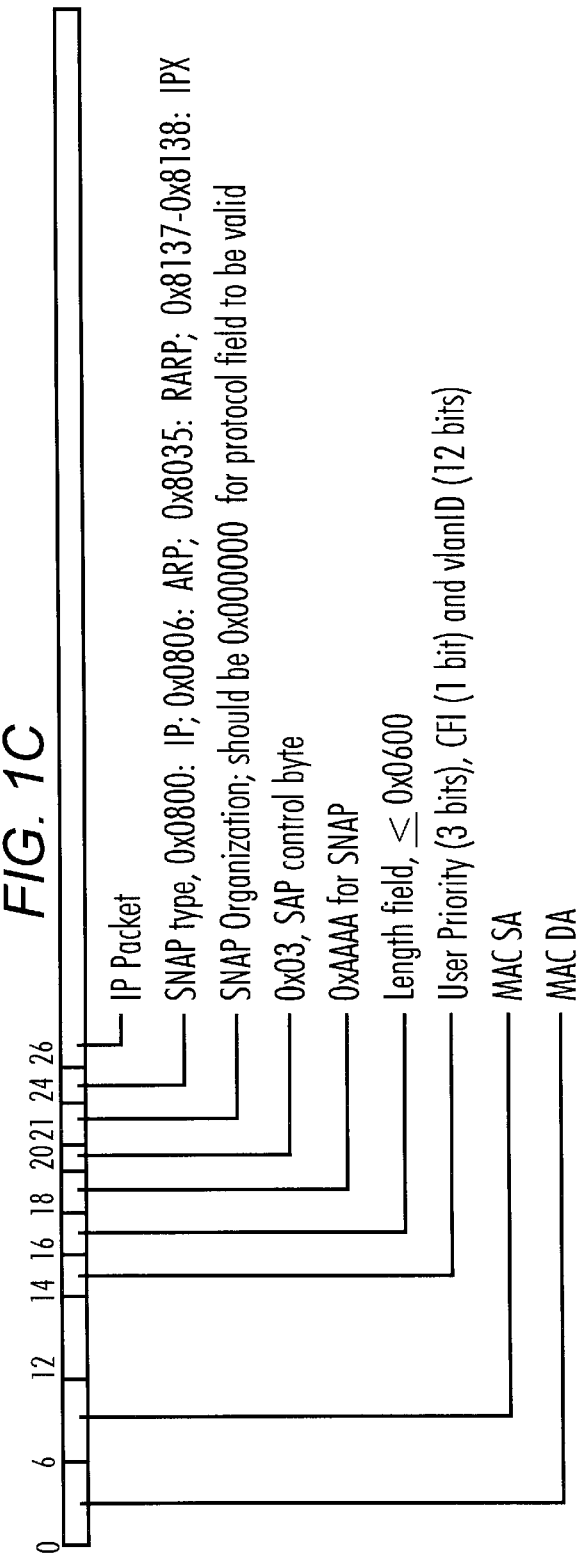

Packets arriving at a device such as a network router and the like, may have any of a plurality of different packet formats, some examples of which are illustrated in FIGS. 1A through 1C. In a typical situation, the packet arrives in a format having several layers of encapsulation, such as a physical layer encapsulation, layer two protocol types and layer three protocol types. Generally the formats for packets arriving at a router or similar device are substantially random in the sense that it is generally impossible to reliably predict what will be the format of the next packet to arrive. Although FIGS. 1A through 1C illustrate three different packet formats, numerous other packet formats are in use and others can be expected to be developed. The present invention can be configured to operate with a plurality of, and preferably all of, the various packet formats.

In general, there are believed to be substantial differences between requirements for parsing network data packets and other types of parsing. The format for data packets arriving e.g. at a router, are substantially random (i.e. substantially unpredictable) and new standards or formats are frequently introduced (and need to be handled by the parser). Such new or different formats may differ substantially from previous formats in a fashion which typically is not under the control of those providing packet parsers. Packets must be parsed at a rate substantially equal to the rate at which the packets arrive, yet data rates used in network or similar communication change frequently in a manner typically not under the control of those who provide packet parsers.

Figure 1D:
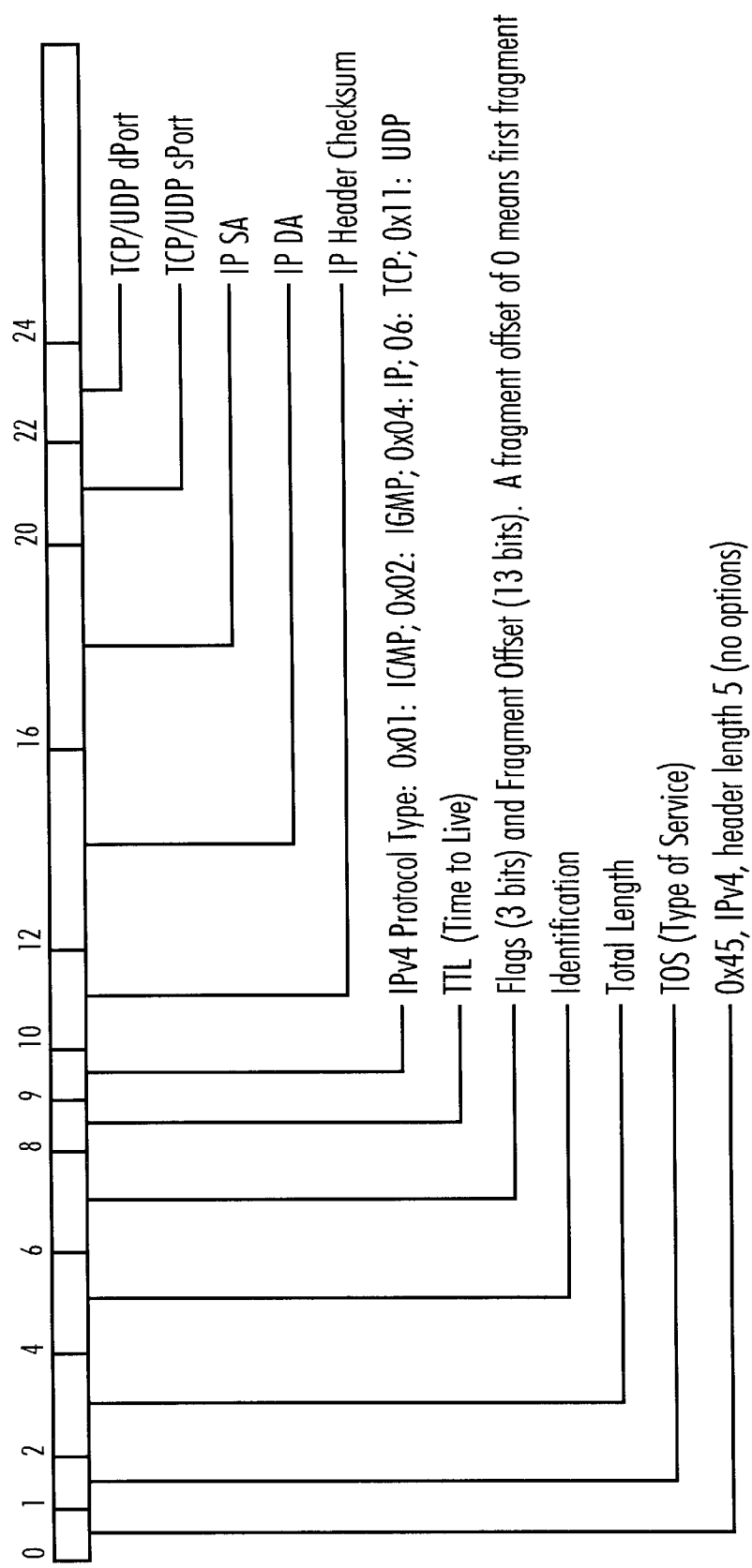
FIG. 1D illustrates an example of Ipv4 format.

When a packet arrives at a router or similar device, the packet may be handled differently by the router depending on such items as the source address (SA), destination address (DA), data type/length, packet total length, type of service (TOS), user priority and the like. Some or all of such information is contained in various fields of the data packet. However, the location of a particular field (i.e. a particular type of information) within a packet may vary among different packet formats. For example, when the format of FIG. 1D is encapsulated using the format of FIG. 1A, the IP DA, resides in bytes 30 through 33 (i.e. the position of IP DA in FIG. 1D, plus the 18 byte offset of FIG. 1A); however when the format of FIG. 1D is encapsulated using the format of FIG. 1C, the IP DA resides in bytes 38 through 41 (i.e. the position of IP DA in FIG. 1D, plus the 26 byte offset of FIG. 1C). Other differences among the location of various fields or types of information in various formats are illustrated in FIGS. 1A through 1D and the formats of various packets are generally known to those of skill in the part and/or defined by various standards such as IEEE 802.2 and 802.3 and the like.

Accordingly, in order for the router or similar device to handle or process a packet, the format of the packet must be determined. Although there may be some buffering capability in the router or similar device, in general, if it is desired for the packet throughput to match the data rate of the incoming data, the router must be able to parse any packet in a time frame no greater than the time between arrival of sequential packets (at the fastest data rate). It is not uncommon for data packets to arrive at a rate of about 150,000 packets per second, e.g. for a 100 megabit link, and the packet rate may be as high as about 1.5 million packets per second, for a 1 gigabit link, or more. Further, it is anticipated that even higher packet rates will be used in the future. Accordingly, the present invention can be configured to perform complete parsing of any packet sufficiently rapidly to keep up with the packet rates noted above, including anticipated increases in packet rates, i.e can parse packets substantially as fast as they arrive.

As one example, a network switch or router (or similar device), when handling the packet, will select, e.g., the output port to which the packet is provided depending, at least partially, on the destination address. Accordingly, before selecting which microcode to execute in connection with handling a given packet, a router must use information regarding the format of the packet such as whether the packet is the format of FIG. 1A, the format of FIG. 1C, or some other format, in order to know whether to use the data in bytes 30–33 (in the format of FIG. 1A) or bytes 38–41 (in the format of FIG. 1C), or other fields in other formats, as the IP destination address. Other fields in the data packet are also used in connection with determining how a packet is to be handled, as will be understood by those of skill in the art.

Figure 2:
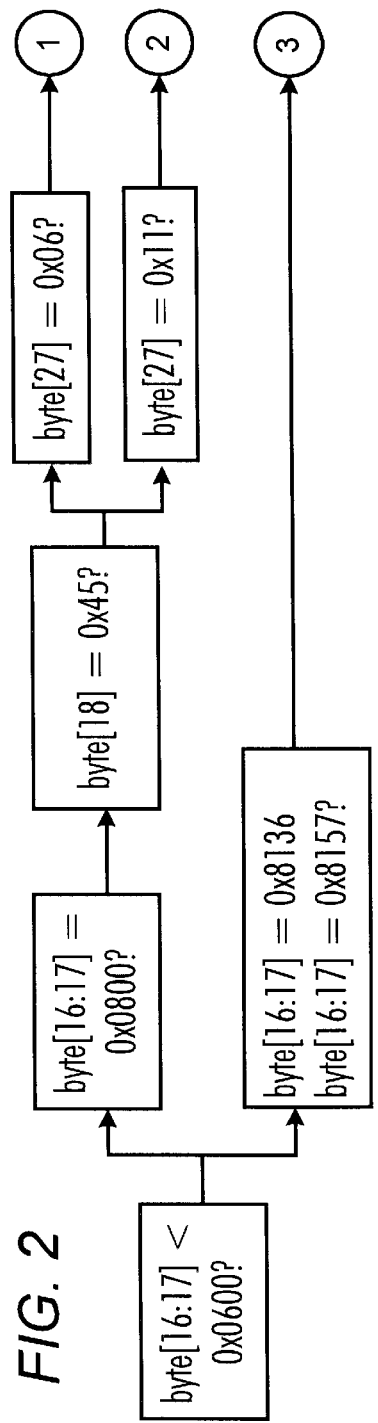
FIG. 2 depicts a logic tree useable for distinguishing among three different packet formats.

Previous approaches to packet parsing have typically involved a multi-step, typically sequential, analysis or decision process. FIG. 2 illustrates the series of decisions or comparisons that may be used in distinguishing among three different packet formats: (1) Ethernet V2 IP TCP; (2) Ethernet V2 IP UDP; (3) Ethernet V2 IPX. In the illustration of FIG. 2, the logic tree involves a plurality of binary (yes/no) decisions or comparisons, typically each comparison involving testing whether a given bit field of the packet (possibly masked) is equal to (or in some cases less than or greater than) a predefined value. The logic tree of FIG. 2 is somewhat simplified in the sense that it distinguishes among only three formats. More complex trees, (although generally still in the nature of that illustrated in FIG. 2) can be used for distinguishing among a larger variety of packet formats, as will be understood by those of skill in the art.

In the logic tree of FIG. 2, the comparisons are performed in a sequential fashion (reading left to right in the illustration of FIG. 2) and the outcome of a given comparison may determine what the next comparison or test is to be. The dependency of a particular comparison or test on the outcome of the previous comparison means that, in this approach, tests are at least partly sequential.

The logic tree of FIG. 2 can be implemented in a number of fashions. In one previous approach, a logic tree in the nature of that depicted in FIG. 2 is implemented by executing microcode in a microprocessor. For example, a given branch or node of the logic tree of FIG. 2 can be implemented, using a microprocessor, by fetching the desired bit field for comparison, optionally masking to select certain bits, performing a "compare" with a pre-stored value fetched from memory and performing a "branch", based on the result of the "compare" operation, to microcode which either performs the next test or outputs the format (if one has been determined).

Another manner of implementing the logic tree of in the nature of that illustrated in FIG. 2 is to use a state machine, e.g., in which branches are hard-coded. For example, the data packet (or portions thereof such as header or footer portions) may be temporarily stored e.g. in a register. Each of (some or all of) the bits in such register can control a branch, e.g. based on a bit compare (such as comparing to, e.g., a hard-wired bit value), with the result of the comparison, possibly combined with results from other comparisons, being used to perform (or control the performance of) other state machine branches, with the process operating in a generally recursive fashion until the packet format has been determined. Those of skill in the art will understand how to provide a state machine with hard-coded branching.

The present invention involves using data which can be written or stored, e.g. in a plurality of registers, providing a type of database, which can be used, in combination, to create a preferably unique signature word identifying the packet format.

Figure 3:
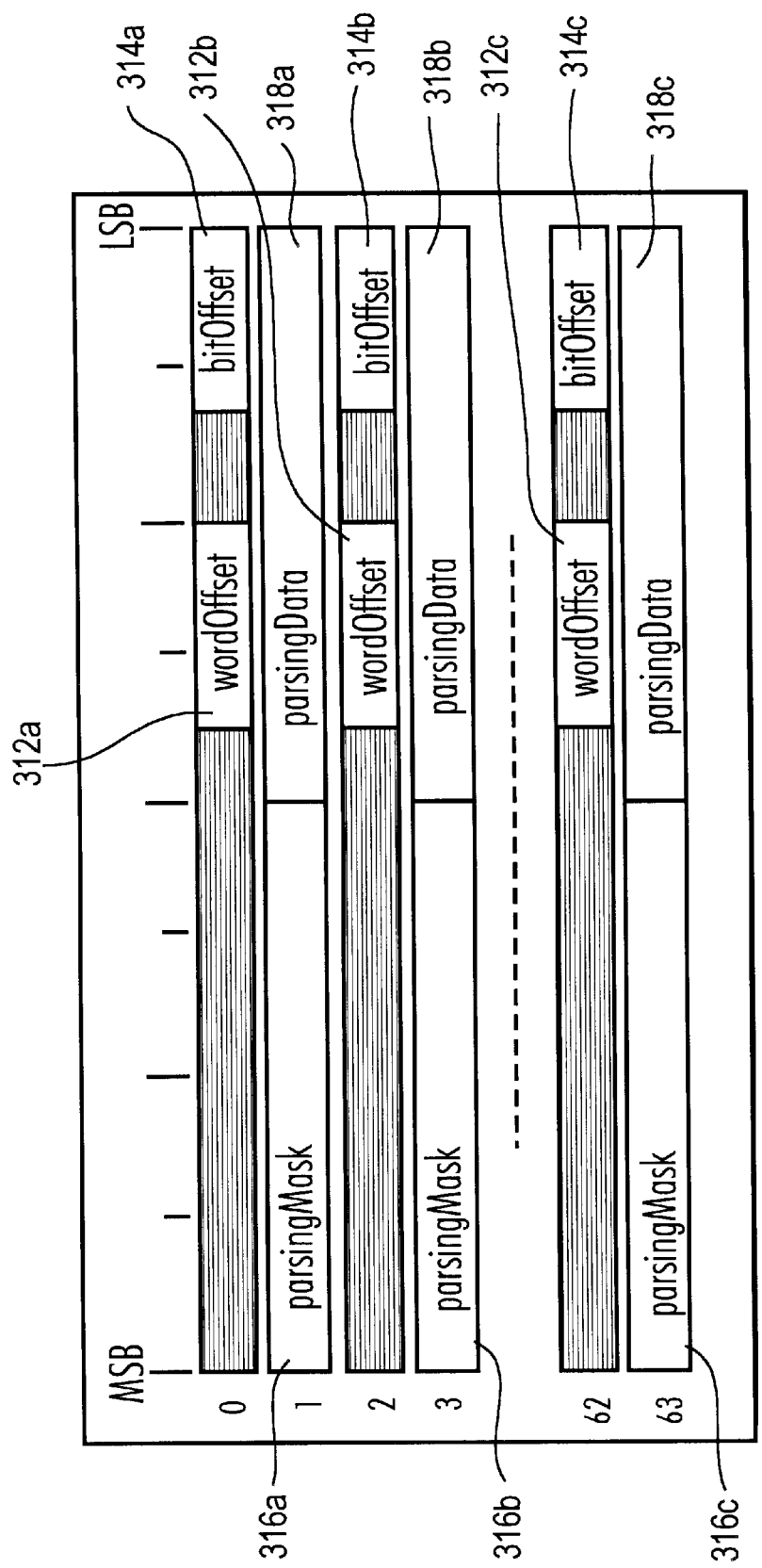
FIG. 3 depicts a set of registers with field indications thereon for storing a database useable in connection with the present invention.

FIG. 3 illustrates one embodiment of a database useable in connection with the present invention. In this embodiment, the database is stored in a plurality of (in the illustrated embodiment, 64) registers organized in pairs. The database contains information defining various comparisons to be made on different fields of the data packet. In the embodiment of FIG. 3, each pair of registers includes a word offset 312a,b,c for defining which word of the data packet contains the field to be used for a given comparison, a bit offset 314a,b,c defining (alone or combined with other comparison results) which bit of the signature is to be set in response to the comparison result, a parsing mask 316a,b,c to select certain bits from the selected word of the data packet for comparison, and parsing data 318a,b,c containing the data bits to which the selected bits from the data packet are to be compared.

Table I provides one example of field definitions for a data base, such as that as illustrated in FIG. 3, according to one embodiment of the invention. The tables below and other examples provided herein are illustrative in nature and are intended as examples and not necessarily as limitations on the scope of the invention. Other formats and fields for databases can also be used as will be apparent to those of skill in the art after understanding the present invention.

TABLE I

| Offset | Field Name | Definition |
|---|---|---|
| 0, 2, 4, . . . | wordOffset | Word offset for the word to be compared from packet header (0 to maximum size of header) |
| | bitOffset | Bit position of the bit to be set in the packetSignature after a match. Multiple bits pointing to the same location result in an ORed operation. (0 to maximum size of packet) |
| | operation | Identifies the compare operation. It can be, e.g., "equal", "not equal", "greater than" or "less than" Example encoding: 00: equal 01: not equal 10: greater than 11: less than |
| | action | Identifies that the corresponding bit should be set or reset if the compare result is true. Example encoding: 0: reset 1: set |
| 1, 3, 5, . . . | parsingMask | The mask to be applied before compare. Example encoding: 1: The bit is compared 0: The bit is masked (not compared) |
| | parsingData | Data to be matched. |

As a somewhat simplified example illustrating one implementation of the present invention, Table II provides values for six entries in a database similar to the database of FIG. 3 which, if used would result in providing a unique signature word for each of the three types of packets distinguished in the illustration of FIG. 2. (In this example, comparison is 16 bits at a time)

TABLE III

| 1. | Ethernet V2 IP TCP –> | 0000_0000_0000_0000_0000_0000_0001_1010 |
| 2. | Ethernet V2 IP UDP –> | 0000_0000_0000_0000_0000_0000_0010_1010 |
| 3. | Ethernet V2 IPX –> | 0000_0000_0000_0000_0000_0000_0000_0100 |

Table III shows the values for three signature words resulting from parsing each of the three types of packet formats of FIG. 2 using a database having entries as illustrated in Table II. In the illustrative example of Table III, the signature word is 32 bits. However, larger or smaller signature words can be used as will be understood by those of skill in the art. As can be seen from Table III, the signature word corresponding to the three different formats have respectively, different values and thus can be used for distinguishing among the three different formats.

TABLE II

| entry | word Offset | parsing-Mask | parsing-Data | operation | action | bitOffset |
|---|---|---|---|---|---|---|
| 1 | 8 | 0xFE00 | 0x0600 | 11 | 1 | 0 |
| 2 | 8 | 0xFFFF | 0x0800 | 00 | 1 | 1 |
| 3 | 8 | 0xFFFF | 0x8137 | 00 | 1 | 2 |

TABLE II-continued

| entry | word Offset | parsing-Mask | parsing-Data | operation | action | bitOffset |
|---|---|---|---|---|---|---|
| 4 | 8 | 0xFFFF | 0x8138 | 00 | 1 | 2 |
| 5 | 9 | 0xFF00 | 0x4500 | 00 | 1 | 3 |
| 6 | 13 | 0x00FF | 0x0006 | 00 | 1 | 4 |
| 7 | 13 | 0x00FF | 0x0011 | 00 | 1 | 5 |

The illustrations of Tables II and III are somewhat simplified in that they are configured for distinguishing among only three different formats. However, the present invention can be used to distinguish among a large number of different formats e.g. by providing additional entries in the database for performing additional comparisons and setting or clearing other bits in the signature word, as will be understood by those of skill in the art after understanding the present disclosure.

Figure 4:
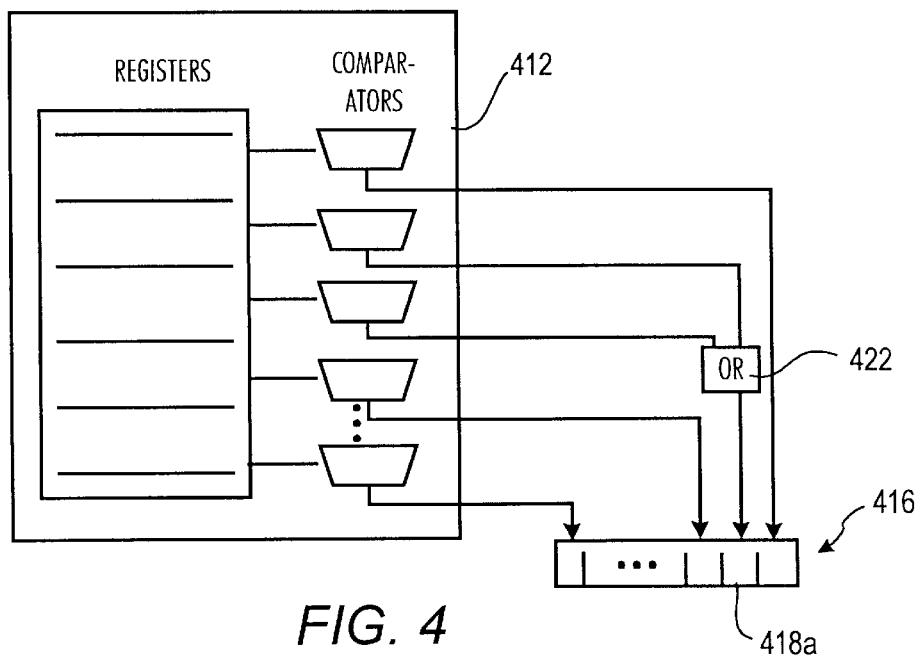
FIG. 4 is a block diagram illustrating an example of using a plurality of registers for forming a signature word according to an embodiment of the present invention.

FIG. 4 is a block diagram schematically depicting a manner in which different entries in the filtering database 412 control comparisons, each of which (alone or combined with other comparisons) results in setting or clearing (e.g in accordance with stored information such as the "action" field in the example of Table I) particular bits of a signature word 416. Although, for clarity, FIG. 4 illustrates a line connection between each entry (i.e. each pair of registers) in the database 412 and a particular bit of the signature word 416, as noted above, the database itself 412 contains information (e.g. bit offsets 314a,b,c) which determines the bit to be set or cleared as a result of the comparison. Accordingly, in practice, the result of the comparison (alone or combined with the result of another comparison) will be routed to a particular bit using the bit offset 314a,b,c as a bit write address for the signature word 416. In some embodiments, it is desired to provide the ability for a given bit of the signature word, (e.g. bit 418a in the illustration of FIG. 4) to be set or cleared as a result of two or more different comparisons. As shown in FIG. 4, this can be implemented by performing an OR operation (or other operation such as AND, NOT, NOR similar logical operations). The OR (or other combination) may be performed by hardwired logic such as an OR gate 422 or can be selected (such as by routing the results of two or more comparisons to a selected type of logic gate under control of another piece of information, e.g. in the "operation" field in the illustrative example above.).

Figure 6:
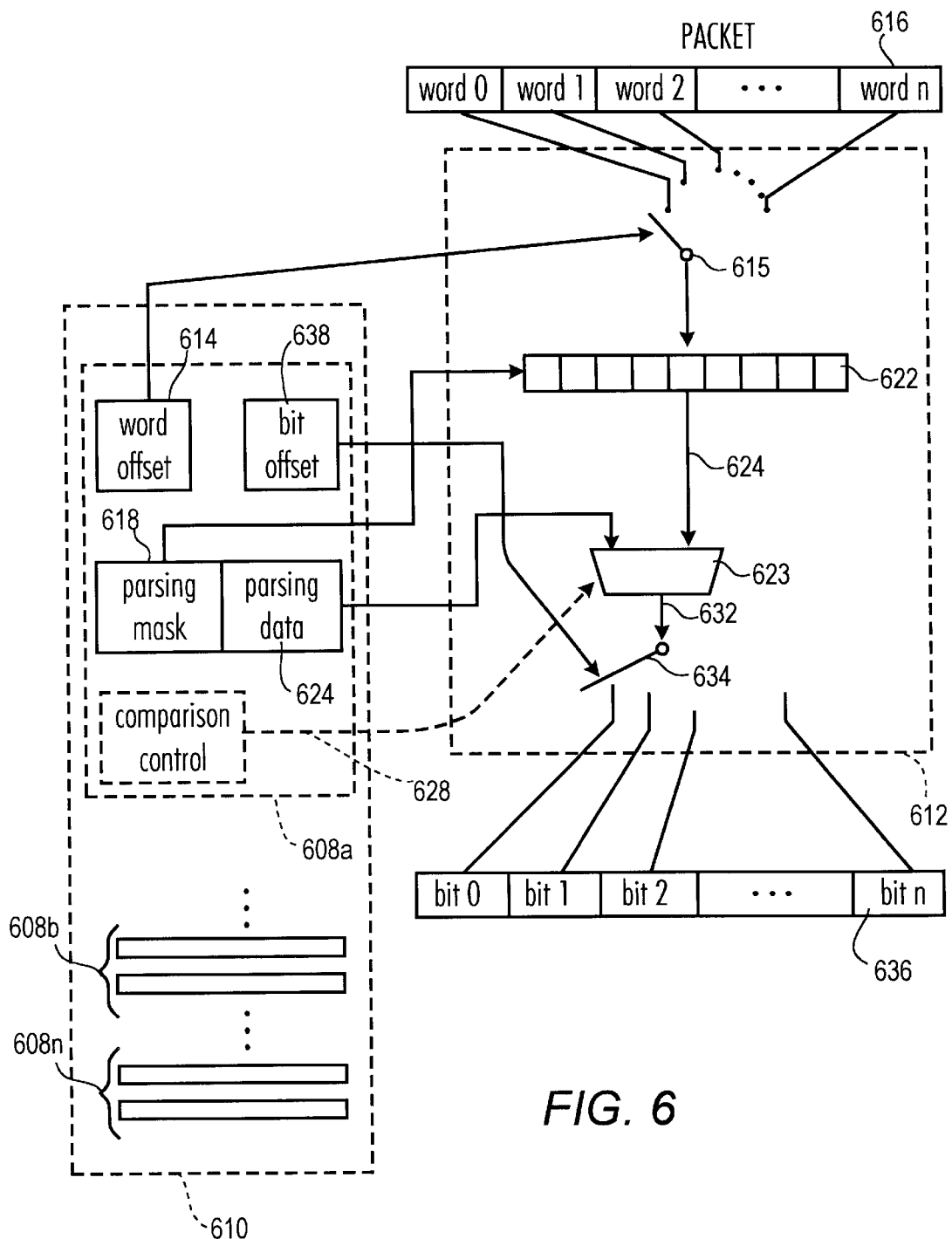
FIG. 6 is a schematic block diagram of a comparator according to an embodiment of the present invention.

The data stored in the filtering database 412 can be used for controlling bit comparisons in a number of fashions. Preferably, as illustrated in FIG. 6, each database entry is coupled to the word offset, mask, and data inputs of a comparator 612. Although FIG. 6 illustrates the comparator 612 in schematic form (such as showing a controlled mechanical switch for selecting word or bit offsets) those of skill in the part will understand how to provide a comparator in a practical sense for performing the functions illustrated schematically in FIG. 6. The comparator 612 will use the word offset information 614 to fetch 615 or use a selected word from the data packet 616, will apply the received mask data 618 to a masking operation 622 to select a particular bit or bits from such word, and will then perform a comparison of the masked packet data 624 with the data received in the data input 626. The comparator 623 may be configured to provide an "equals" comparison (e.g. outputting a "one" if there is an exact match between the masked data from the packet and the input data), may perform a "greater than" or "less than"comparison (outputting a "zero" unless the masked packet data is greater than or less than, respectively, the input data) or may be configured to perform any of these different types of comparisons (e.g. in response to a comparison control signal 628 which may also be stored in the database.

The result bit 632 from the comparison is routed 634 to the proper bit of the signature word 636 under control of a bit offset 638 stored in the database 610.

Although it is possible to configure the creation of the signature word so that it operates in a stepwise fashion (such that comparisons are performed one after another without two or more comparisons being performed simultaneously) it is generally preferred, at present, to perform some or all of the comparisons substantially simultaneously. For example, each of pair of registers 608a,b,n in the database 610 can be coupled to a separate comparator 612 (in the fashion illustrated in FIG. 6) so that some or all of the comparisons can be performed substantially simultaneously and some or all of the bits of the signature word can be set or cleared substantially simultaneously, if desired. In this fashion, it is possible to provide relatively rapid parsing of a data packet, particularly compared with approaches which involve sequential performance of multiple comparisons.

After the signature word identifying the packet format has been formed, the signature word can be used in a number of different fashions. For example, it is possible (although not necessarily practical, in many embodiments) to construct the signature word in a fashion such that the signature word itself operates as a pointer to various microcode (for execution by a microprocessor), for handling the particular type or format of the data packet. This approach, however, places constraints on where microcode entry points for different packet handling procedures can be stored.

Another way of using the signature is to match a (possibly masked) signature with a set of predetermined signatures, e.g. using a look-up table, and obtain associated data (such as an identifier, an "illegal data" indicator, a "send to CPU" indicator, a pointer, or an index to a set of commands).

Figure 5:
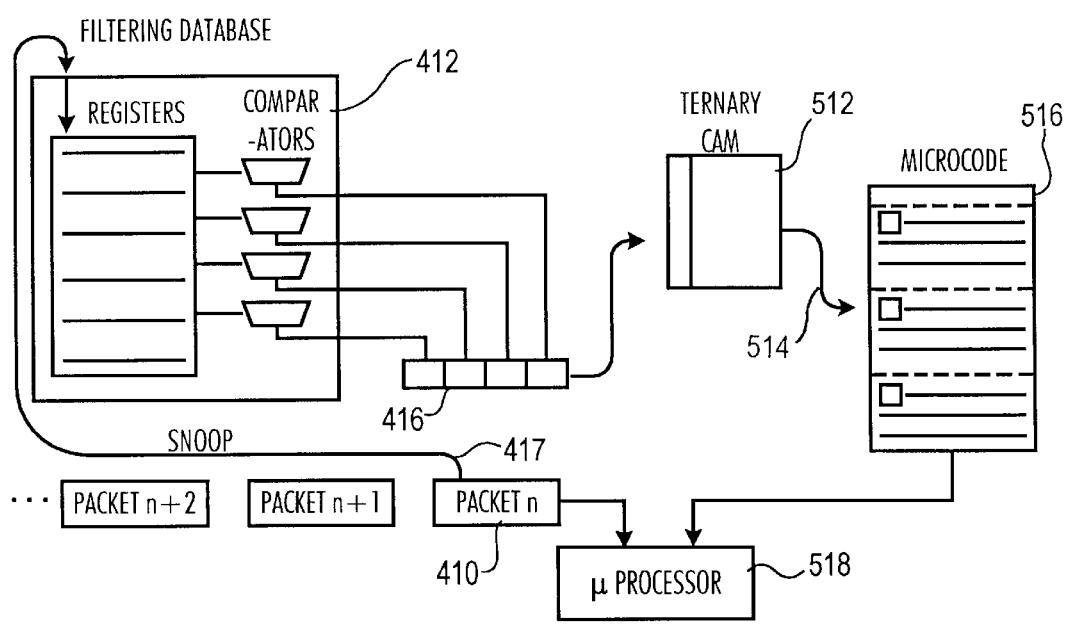
FIG. 5 is a block diagram depicting components used in parsing and handling data packets according to an embodiment of the present invention.

In another approach, illustrated in FIG. 5, packets 410 of the incoming datastream "snooped" 417 for providing packet fields to the database 412 and generating the signature word 416. The signature word 416 is output as a key or lookup argument to a content addressable memory (CAM) 512. In one embodiment, the CAM 512 is a "ternary" CAM, permitting a key, such as the signature word 416, to be masked, if desired, before addressing the CAM. A plurality of pointers are stored in the content addressable memory 512 in such a fashion that, in response to a signature 416 identifying a particular type of or format of packet 416, the CAM 512 outputs a pointer 514 which points to an appropriate entry point in stored microcode or commands (such as microcode stored in an EEPROM 516). The microcode, beginning with the pointed-to entry point, is then executed by a microprocessor 518 which operates on the packet 416 and handles the packet in an appropriate manner according to the information stored in the now-known format of the packet. In one embodiment, the commands which are executed would extract fields of interest from the data packet, depending on the format of the packet. For example, for IP routing lookup, IPSA and IPDA need to be extracted from the packet to perform a lookup. Once the packet is identified as, e.g., an Ethernet V2 encapsulated IP V4 packet, the executed commands can include "extract byte 30–37 as lookup key". It is noted that, although in this and other embodiments, a microprocessor is used for packet handling, it is not necessary to use the microprocessor for the parsing of the packet.

In view of the above description a number of advantages that present invention can be seen. The present invention provides for accommodating new or different types of packet formats in a packet parser by storing new data or information e.g. in a database and substantially without the need (or with reduced need) for creating or installing new hardware. Accordingly, it is no longer necessary, at least in some embodiments of the present invention, to redesign and/or refabricate and a new ASIC or other hardware in order to accommodate a new or different packet format. The present invention is highly flexible in its method of parsing a packet and can accommodate wide variety of different or new packet formats. The present invention can be substantially or completely software-controlled in terms of identifying new or different packet types. Although many types of devices might be used for producing a pointer on the basis of a signature, a CAM, including a ternary CAM, is often included as part of a router or similar system and, in such devices, the CAM of FIG. 5 can be used for the purpose described herein without the need to incur additional hardware costs. The present invention can be implemented without the need for a processor or an embedded microcoded engine for parsing data packets.

A number of variations of modifications of the invention can be used. Although the data base has been described as being stored in a plurality of registers, it is also possible to store some or all of the database information in other storage devices such as a programmable logic array (PLA), programmable read only memory (PROM) or the like. Although the database has been described as including, for each database entry, a field which determines the particular bit of the signature which is to be set or cleared as a result of the comparison, it is also possible to provide this information in another fashion such as by storage in a separate database, and/or by hardwiring. In general it is possible to use some features of the present invention without using others. For example, it is possible to provide the database as described above for (rewriteably) storing certain parsing information such as the data against which fields are to be tested, while providing other information in a different fashion such as being hardwired. For example, although not currently believed to be a preferred approach, it would be possible to use hardwired logic to select the bits from the data packet for each comparison but use the database for (programmably) storing the data to which those bits are to be compared and/or the location of the bits in the signature word to be reset or cleared as a result of such comparisons.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangable and/or equivalent structures, functions, ranges or steps are disclosed herein, and without intending to publicly dedicate any patentable subject matter.

What is claimed is:

1. Apparatus for facilitating parsing of a network data packet comprising:
   a memory device for storing a plurality of database entries,
   at least a first comparator which is controlled, at least partially in response to data from one or more of said database entries, to perform comparison of at least one of the plurality of database entries with at least a portion and to output a first comparison result, of said data packet said first comparison result forming at least a first part of a signature word at least partially identifying a format of said data packet.

2. Apparatus, as claimed in claim 1, wherein said memory device comprises a plurality of registers.

3. Apparatus, as claimed in claim 1, wherein said comparator compares said portion of said data packet to data obtained from said database.

4. Apparatus, as claimed in claim 1, wherein said comparison result is used for setting or clearing a bit location of said signature word and wherein said bit location is selected using data from said database.

5. Apparatus, as claimed in claim 1, wherein said portion of said data packet is selected using data from said database.

6. Apparatus, as claimed in claim 1 wherein said comparator includes masking circuitry for masking said portion of said data packet, using mask data obtained from said database.

7. Apparatus, as claimed in claim 1, further comprising a second comparator which outputs a second comparison result used for forming at least a second part of said signature word.

8. Apparatus, as claimed in claim 1, further comprising a second comparator which outputs a second comparison result for combination with said first comparison result for forming said first part of said signature word.

9. Apparatus, as claimed in claim 1, further comprising a content-addressable memory (CAM) configured to receive said signature word and output a pointer to a microcode entry point.

10. Apparatus, as claimed in claim 1 further comprising a look-up table configured to output associated data in response to said signature word.

11. A method for identifying a format of a network data packet comprising:
   storing a plurality of comparison control data in a database;
   comparing, using a comparator, at least a first portion of said data packet with parsing data, said comparing including outputting at least a first comparison result, wherein said comparing is at least partly controlled using at least first control data from said database;
   forming at least a first portion of a signature word, the at least a first portion of a signature word including said first comparison result.

12. A method, as claimed in claim 11, wherein said step of storing comprises storing in at least a first of a plurality of registers.

13. A method, as claimed in claim 11, further comprising selecting said first portion of said data packet in response to data from said database.

14. A method, as claimed in claim 11, further comprising masking said first portion of said data packet with mask data from said database.

15. A method, as claimed in claim 11, wherein at least a portion of said parsing data is obtained from said database.

16. A method, as claimed in claim 11, further comprising selecting said first portion of said signature word in response to data from said database.

17. A method, as claimed in claim 11, wherein said comparing is selected from the group consisting of a less-than comparison, an equals comparison and a greater-than comparison.

18. A method, as claimed in claim 11, wherein a type of comparison is performed in response to data from said database.

19. A method, as claimed in claim 11, further comprising comparing at least a second portion of said data packet with parsing data and outputting at least a second comparison result.

20. A method as claimed in claim 19 further comprising combining said second comparison result with said first comparison result before said step of forming said first portion of said signature word.

21. A method, as claimed in claim 20, wherein said step of combining said second comparison result with said first comparison result includes performing an OR operation.

22. A method, as claimed in claim 19 further comprising forming a second portion of said signature word, different from said first portion, using said second comparison result.

23. A method, as claimed in claim 11, further comprising selecting one of a plurality of packet handling procedures for handling said packet, wherein said selecting is performed in response to said signature word.

24. A method, as claimed in claim 11, further comprising selecting a microcode entry point at least partially in response to said signature word.

25. A method, as claimed in claim 11 further comprising providing a content-addressable memory (CAM) and outputting a microcode pointer from said CAM in response to said signature word.

26. A method, as claimed in claim 11, further comprising storing new data in said database facilitating the handling of a different packet format.

27. Apparatus for identifying a format of a network data packet comprising:
   means for storing a plurality of comparison control data;
   means for comparing at least a first portion of said data packet with parsing data, and outputting at least a first comparison result, wherein said means for comparing is at least partly controlled using at least first control data from said means for storing;
   means for forming at least a first portion of a signature word, the at least a first portion of a signature word including said first comparison result.

28. Apparatus, as claimed in claim 27, wherein said means for storing comprises a plurality of registers.

29. Apparatus, as claimed in claim 27, further comprising means for selecting said first portion of said data packet in response to data from said means for storing.

30. Apparatus, as claimed in claim 27, further comprising means for masking said first portion of said data packet with mask data from said means for storing.

31. Apparatus, as claimed in claim 27, wherein at least a portion of said parsing data is obtained from said means for storing.

32. Apparatus, as claimed in claim 27, further comprising means for selecting said first portion of said signature word in response to data from said means for storing.

33. Apparatus, as claimed in claim 27, further comprising means for selecting a type of comparison in response to data from said means for storing.

34. Apparatus, as claimed in claim 27, further comprising second means for comparing at least a second portion of said data packet with parsing data and outputting at least a second comparison result.

35. Apparatus as claimed in claim 34 further comprising means for combining said second comparison result with said first comparison result.

36. Apparatus, as claimed in claim 35, wherein said means for combining said second comparison result with said first comparison result includes an OR gate.

37. Apparatus, as claimed in claim 34 further comprising means for forming a second portion of said signature word, different from said first portion, using said second comparison result.

38. Apparatus, as claimed in claim 27, further comprising means for selecting one of a plurality of packet handling procedures for handling said packet, in response to said signature word.

39. Apparatus, as claimed in claim 27, further comprising means for selecting a microcode entry point at least partially in response to said signature word.

40. Apparatus, as claimed in claim 27 further comprising a content-addressable memory (CAM) configured to output a microcode pointer from said CAM in response to said signature word.

41. A method for handling a network data packet having a first format, comprising:
   storing, in at least a first of plurality of registers, a plurality of comparison control data, forming a database;
   selecting a first portion of said data packet in response to data from said database;
   masking said first portion of said data packet with mask data from said database, to provide masked packet data;
   comparing, using a comparator, said masked packet data with parsing data obtained from said database, and outputting a first comparison result;
   forming at least a first portion of a signature word, the at least a first portion of a signature word including said first comparison result wherein said first portion of said signature word is selected in response to data from said database;
   comparing at least a second portion of said data packet with parsing data and outputting at least a second comparison result;
   forming a second portion of said signature word, different from said first portion, using said second comparison result;
   providing associated data in response to said signature word; and
   handling said data packet in accordance with said associated data.

42. A method, as claimed in claim 41, further comprising providing a content-addressable memory (CAM) and wherein said step of providing associated data comprises outputting a microcode pointer from said CAM in response to said signature word.

43. A method, as claimed in claim 42, further comprising:
   using said microcode pointer to select a microcode entry point; and executing microcode, beginning at said entry pont, in a microprocessor, for said handling of said data packet.

44. A method, as claimed in claim 41, wherein said outputting said second comparison result is performed substantially simultaneously with said outputting said first, comparison result.

* * * * *

UNITED STATES PATENT AND TRADEMARK OFFICE
CERTIFICATE OF CORRECTION

PATENT NO. : 6,611,524 B2  Page 1 of 1
APPLICATION NO. : 09/340256
DATED : August 26, 2003
INVENTOR(S) : Harish Devanagondi and James Sun It is certified that error appears in the above-identified patent and that said Letters Patent is hereby corrected as shown below:

At Column 10, line 19 after "portion" please insert --of said data packet--

At Column 10, line 19 after "result," please delete "of said data packet"

Signed and Sealed this

Thirty-first Day of July, 2007

JON W. DUDAS
*Director of the United States Patent and Trademark Office*